US012140110B2

(12) United States Patent
Yamazaki et al.

(10) Patent No.: US 12,140,110 B2
(45) Date of Patent: Nov. 12, 2024

(54) INTERNAL COMBUSTION ENGINE

(71) Applicant: HONDA MOTOR CO., LTD., Tokyo (JP)

(72) Inventors: Wataru Yamazaki, Wako (JP); Fumio Minami, Wako (JP); Takashi Suzuki, Wako (JP); Shogo Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/549,709

(22) PCT Filed: Mar. 12, 2021

(86) PCT No.: PCT/JP2021/010180
§ 371 (c)(1),
(2) Date: Sep. 8, 2023

(87) PCT Pub. No.: WO2022/190383
PCT Pub. Date: Sep. 15, 2022

(65) Prior Publication Data

US 2024/0151195 A1 May 9, 2024

(51) Int. Cl.
*F02M 35/02* (2006.01)
*F02M 35/024* (2006.01)
*F02M 35/10* (2006.01)

(52) U.S. Cl.
CPC ...... *F02M 35/024* (2013.01); *F02M 35/0201* (2013.01); *F02M 35/10013* (2013.01)

(58) Field of Classification Search
CPC ............... F02M 35/02; F02M 35/0201; F02M 35/0223; F02M 35/024; F02M 35/02416;
(Continued)

(56) References Cited

U.S. PATENT DOCUMENTS 6,295,953 B1 * 10/2001 Ohsawa ................. F02M 35/04 123/437
6,378,467 B1 * 4/2002 Kobayashi .............. F02B 63/02 123/41.7
(Continued)

FOREIGN PATENT DOCUMENTS

JP 61-188427 U 11/1986
JP 62-43172 U 3/1987
(Continued)

OTHER PUBLICATIONS

International Search Report, International Application No. PCT/JP2021/010180, Date of mailing: May 11, 2021, 3 pages.
(Continued)

*Primary Examiner* — Phutthiwat Wongwian
*Assistant Examiner* — Johnny H Hoang
(74) *Attorney, Agent, or Firm* — Rankin, Hill & Clark LLP

(57) ABSTRACT

An internal combustion engine capable of reducing an amount of dust taken from an outside air intake opening, with a simple configuration. The internal combustion engine includes a crankshaft, a cooling air intake device that houses a cooling fan coupled to the crankshaft and that includes a cooling air intake port, and an air cleaner device that feeds outside air to an air suction port to a cylinder, and the air cleaner device includes an outside air intake opening that opens toward the cooling air intake port.

7 Claims, 4 Drawing Sheets

(58) Field of Classification Search
CPC ........... F02M 35/0216; F02M 35/0226; F02M 35/048; F02M 35/06; F02M 35/1017; F02M 35/10013; F02B 63/02; F02B 2075/027; Y02T 10/12; B01D 45/16; B01D 46/2411; B01D 46/64; B01D 50/20
See application file for complete search history.

(56) References Cited

U.S. PATENT DOCUMENTS

| | | | | |
|---|---|---|---|---|
| 2005/0241609 | A1* | 11/2005 | Kobayashi ....... | F02M 35/10275 123/184.21 |
| 2009/0235538 | A1* | 9/2009 | Sugishita ................ | F02B 63/02 123/198 E |
| 2009/0314249 | A1 | 12/2009 | Taniguchi | |
| 2013/0291810 | A1* | 11/2013 | Nishikawa ........... | B23D 59/006 123/2 |
| 2016/0265491 | A1* | 9/2016 | Kawamura ............ | F02M 35/06 |
| 2016/0288860 | A1* | 10/2016 | Tani ....................... | B62K 19/30 |
| 2021/0199078 | A1 | 7/2021 | Gomibuchi et al. | |

FOREIGN PATENT DOCUMENTS

| | | | |
|---|---|---|---|
| JP | 62-88873 | U | 6/1987 |
| JP | 2000-263509 | A | 9/2000 |
| JP | 2007-046586 | A | 2/2007 |
| JP | 2012-163087 | A | 8/2012 |
| JP | 5238372 | B2 | 7/2013 |
| JP | 2016-160841 | A | 9/2016 |
| JP | 2017-133375 | A | 8/2017 |

OTHER PUBLICATIONS

Written Opinion of the International Searching Authority dated May 11, 2021 filed in PCT/JP2021/010180,, 5 pages.
English translation of the International Preliminary Report on Patentability issued Sep. 21, 2023 in corresponding International application No. PCT/JP2021/010180 (6 pages).

* cited by examiner

INTERNAL COMBUSTION ENGINE

TECHNICAL FIELD

The present invention relates to an internal combustion engine.

BACKGROUND ART

Conventionally, a walking-type lawn mower is known. In this walking-type lawn mower, it is necessary to ensure that mowed grass and dust are not suctioned into an internal combustion engine.

Such an internal combustion engine for use in this lawn mower conventionally employs a so-called "snorkel air cleaner structure" where an air introduction part for introducing outside air into an air cleaner is provided at a position far from the ground, that is, on an operation handle, and an air introduction tube connects the air introduction part to the air cleaner. A technique of, when the internal combustion engine is operated, suctioning outside air from the air introduction part by air suction negative pressure of the internal combustion engine and introducing outside air through an air introducing port into the air cleaner via the air introduction tube has been disclosed (see, for example, Patent Literature 1).

CITATION LIST

Patent Literature

[Patent Literature 1]
Japanese Patent No. 5238372

SUMMARY OF INVENTION

Technical Problem

Patent Literature 1 describes a technique capable of reducing clogging of a filter of an air cleaner element of a snorkel air cleaner for use even in a location where there is a lot of dust, but the technique requires a large number of components including an air introduction tube and results in high cost.

The present invention has been made in view of the above-described respects and has an object to provide an internal combustion engine capable of reducing an amount of dust taken from an outside air intake opening, with a simple configuration.

Solution to Problem

In order to achieve the above object, the present invention includes a crankshaft, a cooling air intake device that houses a cooling fan coupled to the crankshaft and that includes a cooling air intake port, and an air cleaner device that feeds outside air to an air suction port to a cylinder, and the air cleaner device includes an outside air intake opening that opens toward the cooling air intake port.

Advantageous Effects of Invention

According to the present invention, an outside air intake opening of an air cleaner device opens toward a cooling air intake port, and a force to take in cooling air from the cooling air intake port is large, so that large dust or the like can be taken into the cooling air intake port, and an amount of dust taken from the outside air intake opening can be reduced.

DESCRIPTION OF EMBODIMENT

Hereinafter, embodiments will be described with reference to the drawings.

Figure 1:
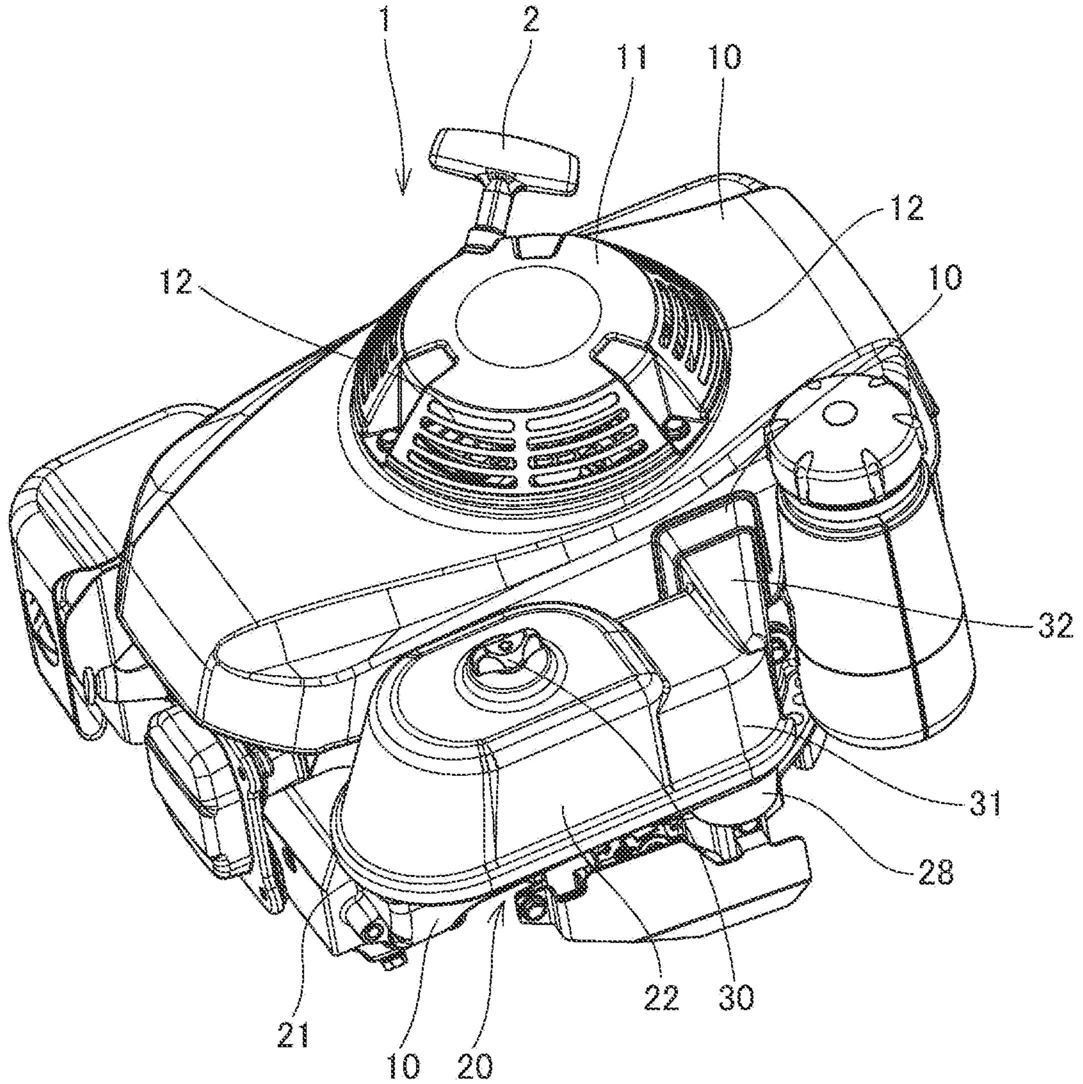
FIG. 1 is a perspective view showing a configuration of an internal combustion engine of the present embodiment.
Figure 2:
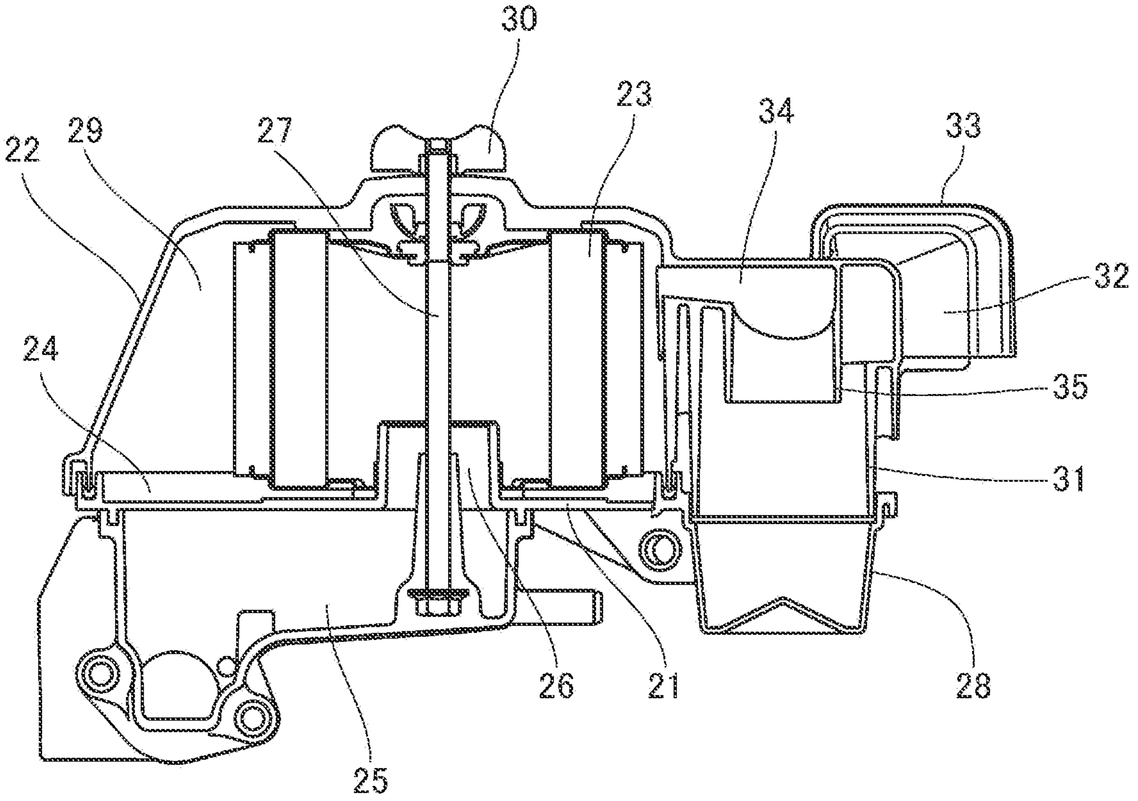
FIG. 2 is a longitudinal sectional view of an air cleaner device of the present embodiment.
Figure 3:
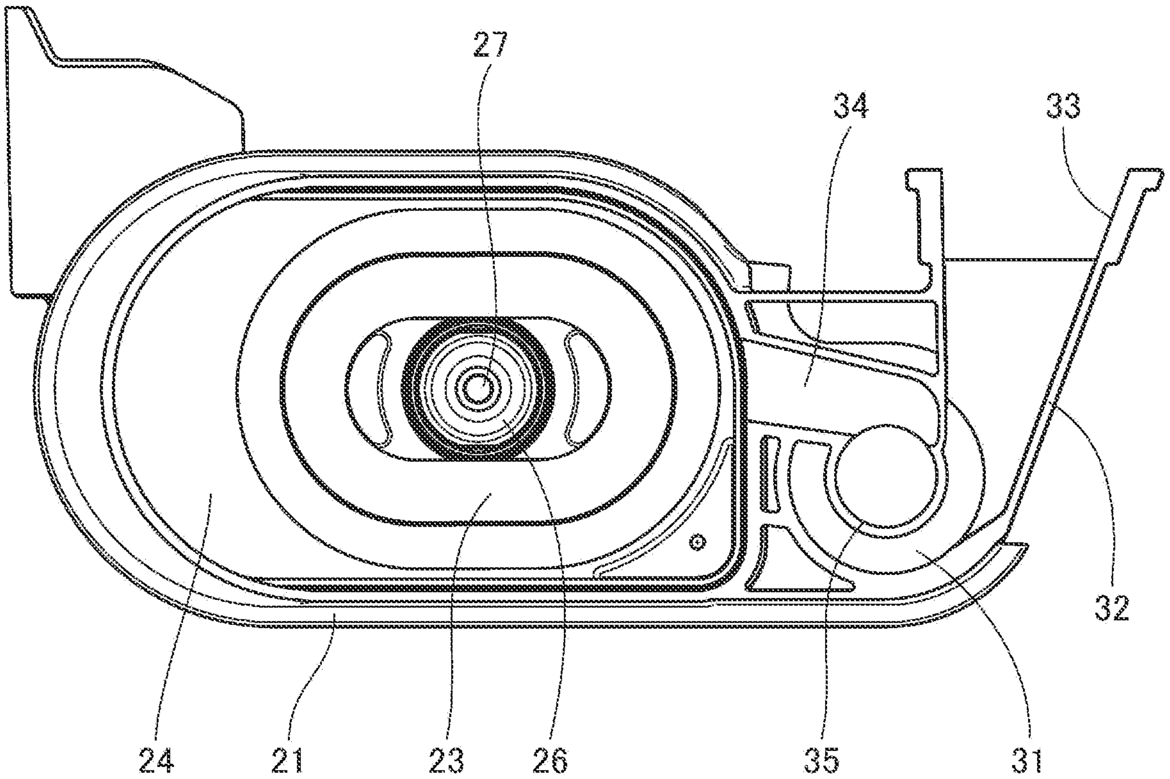
FIG. 3 is a transverse sectional view of the air cleaner device of the present embodiment.
Figure 4:
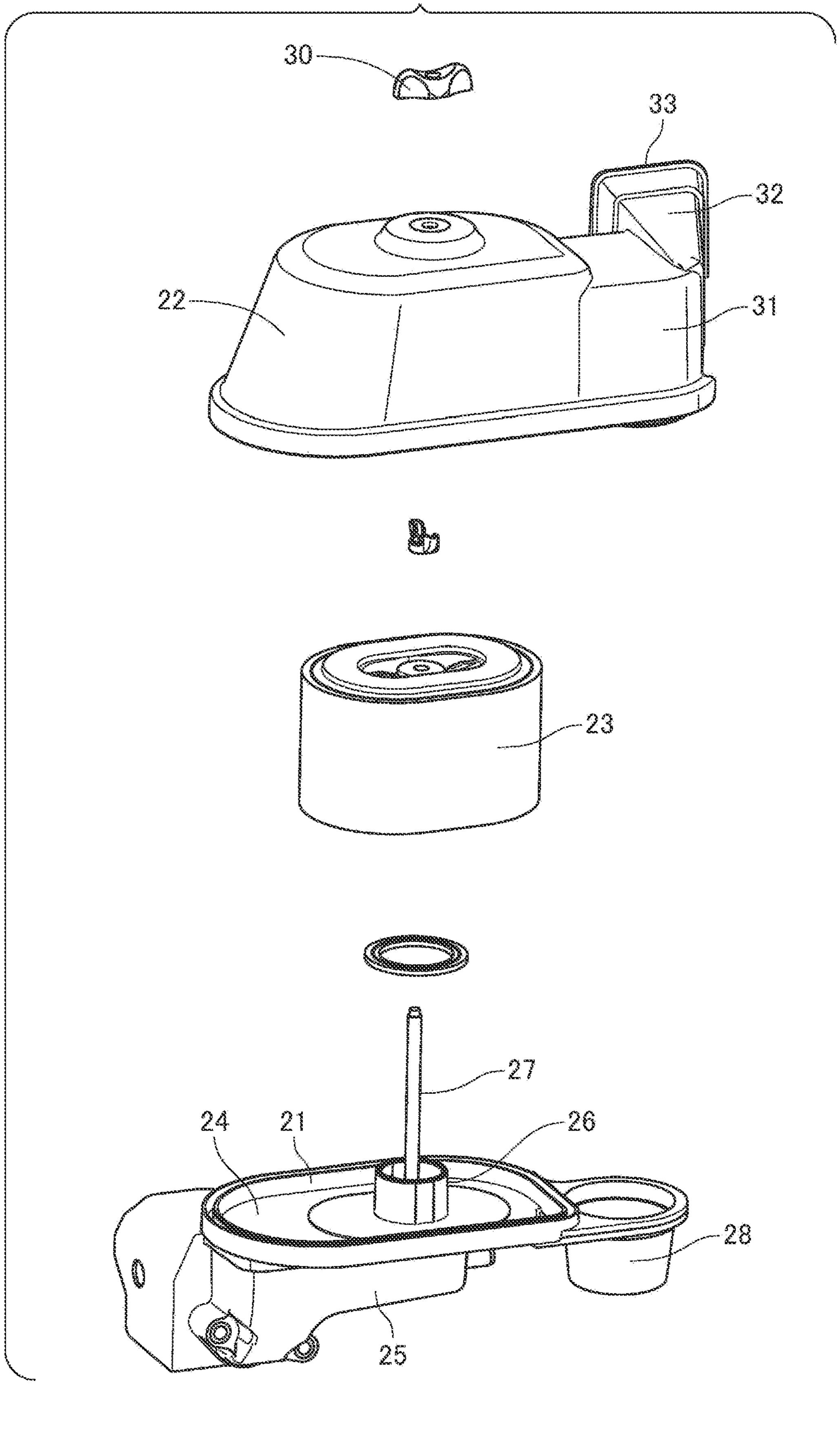
FIG. 4 is an exploded perspective view of the air cleaner device of the present embodiment.

FIG. 1 is a perspective view showing a configuration of an internal combustion engine of the present embodiment. FIG. 2 is a longitudinal sectional view of an air cleaner device of the present embodiment. FIG. 3 is a transverse sectional view of the air cleaner device of the present embodiment. FIG. 4 is an exploded perspective view of the air cleaner device of the present embodiment.

As shown in FIG. 1, in the present embodiment, an internal combustion engine 1 includes a recoil lever 2 for starting the internal combustion engine 1. The internal combustion engine 1 has an upper part provided with a cooling air intake cover 10 that covers an entire upper region of the internal combustion engine 1. The cooling air intake cover 10 is configured to take in cooling air for cooling the internal combustion engine 1.

The cooling air intake cover 10 includes a cooling air intake part 11 formed in a circular shape in a substantially central part to substantially circularly protrude upward.

The cooling air intake part 11 is formed in a longitudinal sectional shape that is a substantially trapezoidal shape, and the cooling air intake part 11 has a side surface including a cooling air intake port 12 formed in a plurality of stages along a circumferential direction and in an up-down direction.

Inside the cooling air intake cover 10, a cooling fan (not shown) mounted on a crankshaft (not shown) of the internal combustion engine 1 is housed, and the cooling fan is driven via the crankshaft to feed cooling air from the cooling air intake port 12 toward the internal combustion engine 1.

On one side of the internal combustion engine 1, an air cleaner device 20 is provided. As shown in FIGS. 2 to 4, the air cleaner device 20 includes a body member 21 and a cover member 22.

The body member 21 includes a body side housing 24 of an oblong air cleaner element 23. The body member 21 has a lower surface side provided with a ventilation duct 25 communicating with an air suction port (not shown) of a cylinder head (not shown) of the internal combustion engine 1. An air feeding opening 26 for communicating between the body side housing 24 and the ventilation duct 25 is formed in a substantially central part of the housing of the body member 21.

In the substantially central part of the housing of the body member 21, a supporting column 27 that supports the air cleaner element 23 is mounted.

On an outside air inflow side of the body member 21, a cyclone cup 28 constituting a part of a cyclone forming section is integrally provided.

The cover member 22 includes a cover side housing 29 that covers the body side housing 24 and the air cleaner element 23 from above. The body side housing 24 and the cover side housing 29 constitute a filter housing according to the present invention.

The cylindrical air cleaner element 23 is disposed outside the supporting column 27. The air cleaner element 23 is fixed to the inside of the body side housing 24 and the cover side housing 29 by attaching the cover member 22 to the body member 21 and screwing a nut member 30 into a tip of the supporting column 27 from the outside of the cover member 22.

In this state, outside air supplied to the cover member 22 passes through a peripheral surface of the air cleaner element 23 and is then fed to the air suction port of the internal combustion engine 1 via the air feeding opening 26 and the ventilation duct 25.

On the outside air inflow side of the cover member 22, a cyclone ventilation part 31 constituting a part of the cyclone forming section is provided.

An outside air intake member 32 is formed integrally on one side of the cyclone ventilation part 31. The outside air intake member 32 includes an outside air intake opening 33 opening toward the cooling air intake cover 10, and the outside air intake member 32 is formed in a tapered manner to reduce in sectional area from the outside air intake opening 33 toward the cyclone ventilation part 31.

The outside air intake opening 33 faces the side surface of the cooling air intake cover 10 with a predetermined gap, and the outside air intake opening 33 is partially disposed below an upper edge of the side surface of the cooling air intake cover 10.

Further, the outside air intake member 32 is configured to have an outside air intake direction that coincides with a substantially tangential direction of the cyclone ventilation part 31.

Above the inside of the cyclone ventilation part 31, an air suction flow path 34 communicating with the cover side housing 29 is provided. Inside the cyclone ventilation part 31, a partition wall 35 for forming a cyclonic state of outside air taken from the outside air intake member 32 is provided. The partition wall 35 is disposed at a predetermined interval with respect to the inner peripheral surface of the cyclone ventilation part 31 and is configured such that the inside of the partition wall 35 communicates with the air suction flow path 34.

Then, the cyclonic state of outside air taken in the tangential direction of the cyclone ventilation part 31 from the outside air intake opening 33 of the outside air intake member 32 is formed by the partition wall 35 and fed to the cover side housing 29 via the air suction flow path 34 while swirling.

At this time, refuse or the like contained in the outside air formed in cyclonic flow is separated by cyclone and allowed to drop into the cyclone cup 28. Thereby, outside air from which refuse or the like has been removed is only fed from the air suction flow path 34.

Next, the operation of the present embodiment will be described.

In the present embodiment, when the internal combustion engine 1 is driven, outside air is taken from the air suction port of the cylinder head of the internal combustion engine 1. Thereby, outside air is taken from the outside air intake opening 33.

In this case, the cooling fan is rotated via the crankshaft by driving the internal combustion engine 1, to take cooling air from the cooling air intake port 12, but a force to take in cooling air is large, so that large dust or the like is taken into the cooling air intake port 12, and an amount of dust taken from the outside air intake opening 33 can be reduced.

In addition, since the outside air intake opening 33 faces the cooling air intake cover 10, it can be made difficult to take in dust or the like that has risen due to a work. Further, it is not necessary to provide any space around the outside air intake opening 33, and hence the whole internal combustion engine 1 can be made compact.

Further, the cooling air taken from the cooling air intake port 12 is different in suction direction from the outside air suctioned from the outside air intake opening 33, and air flow in the vicinity of the outside air intake opening 33 is complicated and can therefore make it difficult to take dust or the like from the outside air intake opening 33.

Further, dust or the like blown up falls from above, but at least a part of the outside air intake opening 33 is disposed below the upper edge of the side surface of the cooling air intake cover 10, and hence dust or the like is first taken into the cooling air intake port 12, so that dust or the like contained in the outside air taken from below the outside air intake opening 33 flows against a gravity direction, and comparatively large dust or the like is less likely to be suctioned.

Outside air taken from the outside air intake opening 33 forms cyclone vortex in the cyclone ventilation part 31 and is fed to the cover side housing 29.

At this time, the cyclone vortex is formed, and due to centrifugal force of the cyclone vortex, dust or the like contained in outside air is collected on the outer peripheral side of the cyclone ventilation part 31 and allowed to drop down into the cyclone cup 28. The dust or the like collected in the cyclone cup 28 is discharged to the outside from an unshown discharge port provided in a bottom of the cyclone cup 28.

Outside air taken into the cover side housing 29 passes from the outer peripheral side of the air cleaner element 23 through the air cleaner element 23 and is fed to the inside of the air cleaner element 23 and then through the air feeding opening 26 and the ventilation duct 25 to the air suction port of the cylinder head.

As described above, the present embodiment includes a cooling air intake device that houses the cooling fan coupled to the crankshaft and that includes the cooling air intake port 12, and the air cleaner device 20 that feeds outside air to the air suction port to a cylinder, and the air cleaner device 20 includes the outside air intake opening 33 opening toward the cooling air intake port 12.

Accordingly, since the outside air intake opening 33 of the air cleaner device 20 opens toward the cooling air intake port 12 and the force to take in cooling air from the cooling air intake port 12 is large, large dust or the like can be taken into the cooling air intake port 12, and the amount of dust taken from the outside air intake opening 33 can be reduced.

In the present embodiment, a part of the outside air intake opening 33 of the air cleaner device 20 faces the cooling air intake cover 10 of the cooling air intake device with the predetermined gap.

This can make it difficult to take dust or the like that has risen due to the work, from the outside air intake opening 33. Further, it is not necessary to provide any space around the outside air intake opening 33, and hence the whole internal combustion engine 1 can be made compact. In addition, the cooling air taken from the cooling air intake port 12 is different in suction direction from the outside air suctioned from the outside air intake opening 33, and flow of air in the vicinity of the outside air intake opening 33 is complicated and can therefore make it difficult to take dust or the like from the outside air intake opening 33.

In the present embodiment, the air cleaner device 20 includes the cyclone ventilation part 31 that supplies outside air in a cyclonic state from the outside air intake opening 33.

Accordingly, the cyclone ventilation part 31 forms a cyclone vortex, and due to a centrifugal force of the cyclone vortex, dust or the like contained in outside air can be collected on the outer peripheral side of the cyclone ventilation part 31 and allowed to drop down, so that dust or the like fed to the air cleaner element 23 can be reduced.

In the present embodiment, a filter housing that houses the air cleaner element 23 is disposed between a connector to the air suction port of the air cleaner device 20 and the cyclone ventilation part 31.

Accordingly, the internal combustion engine 1 usually has an outer shape determined by arrangement of the air suction port of the cylinder head and the crankshaft, but when the filter housing is disposed between the connector of the air suction port and the cyclone ventilation part 31, the air cleaner device 20 can be disposed along the outer shape of the internal combustion engine 1, and the air cleaner device 20 can be placed without increasing a lateral width of the whole internal combustion engine 1.

In the present embodiment, at least a part of the outside air intake opening 33 of the air cleaner device 20 is disposed lower than the cooling air intake port 12.

Accordingly, at least a part of the outside air intake opening 33 is disposed below the upper edge of the side surface of the cooling air intake cover 10, and hence dust or the like falling from above is first taken into the cooling air intake port 12, so that dust or the like contained in outside air taken from below the outside air intake opening 33 flows against the gravity direction, and comparatively large dust or the like is less likely to be suctioned.

In the present embodiment, the cyclone ventilation part 31 is formed by joining the body member 21 and the cover member 22 of the air cleaner device 20.

Accordingly, the housing that houses the air cleaner element 23 and the cyclone ventilation part 31 can be formed simply by joining the body member 21 and the cover member 22, which can reduce manufacturing man-hours and can reduce manufacturing cost.

In the present embodiment, a ventilation flow path from the outside air intake opening 33 to the cyclone ventilation part 31 is provided in an upper part of the cyclone ventilation part 31 and substantially orthogonally to an axis of cyclonic flow.

Accordingly, a cyclone vortex can be easily generated inside the cyclone ventilation part 31 with a simple configuration.

In the present embodiment, the internal combustion engine 1 is a vertical type for use in a lawn mower or a construction machine and includes the crankshaft extending in a substantially vertical direction.

Accordingly, when the internal combustion engine 1 is used in the lawn mower, construction machine or the like, the engine is effectively used in an environment where dust or the like is likely to be generated due to the work.

The present invention is not limited to the configuration of the above embodiment and can be implemented in various aspects without departing from the gist of the invention.

Configurations Supported by the Above Embodiment

The above embodiment supports the following configurations.

(Configuration 1) An internal combustion engine including a crankshaft, a cooling air intake device that houses a cooling fan coupled to the crankshaft and that includes a cooling air intake port, and an air cleaner device that feeds outside air to an air suction port to a cylinder, wherein the air cleaner device includes an outside air intake opening that opens toward the cooling air intake port.

According to this configuration, the outside air intake opening of the air cleaner device opens toward the cooling air intake port, and a force to take in cooling air from the cooling air intake port is large, so that large dust or the like is taken into the cooling air intake port, and an amount of dust taken from the outside air intake opening can be reduced.

(Configuration 2) The internal combustion engine according to configuration 1, wherein a part of the outside air intake opening of the air cleaner device faces a cooling air intake cover of the cooling air intake device with a predetermined gap.

This configuration can make it difficult to take dust or the like that has risen due to a work, from the outside air intake opening. It is not necessary to provide any space around the outside air intake opening, and hence the whole internal combustion engine can be made compact. The cooling air taken from the cooling air intake port is different in suction direction from the outside air suctioned from the outside air intake opening, and flow of air in the vicinity of the outside air intake opening is complicated and can therefore make it difficult to take dust or the like from the outside air intake opening.

(Configuration 3) The internal combustion engine according to configuration 1 or 2, wherein the air cleaner device includes a cyclone ventilation part that supplies outside air in a cyclonic state from the outside air intake opening.

According to this configuration, the cyclone ventilation part forms a cyclone vortex, and due to a centrifugal force of the cyclone vortex, dust or the like contained in outside air can be collected on an outer peripheral side of the cyclone ventilation part and allowed to drop down, so that dust or the like fed to an air cleaner element can be reduced.

(Configuration 4) The internal combustion engine according to configuration 3, wherein a filter housing that houses an air cleaner element is disposed between a connector to the air suction port of the air cleaner device and the cyclone ventilation part.

According to this configuration, the internal combustion engine usually has an outer shape determined by arrangement of the air suction port of the cylinder head and the crankshaft, but when the filter housing is disposed between the connector of the air suction port and the cyclone ventilation part, the air cleaner device can be disposed along the outer shape of the internal combustion engine, and the air cleaner device can be placed without increasing a lateral width of the whole internal combustion engine.

(Configuration 5) The internal combustion engine according to configuration 3, wherein at least a part of the outside air intake opening of the air cleaner device is disposed lower than the cooling air intake port.

According to this configuration, at least a part of the outside air intake opening is disposed below an upper edge of a side surface of the cooling air intake cover, and hence dust or the like falling from above is first taken into the cooling air intake port, so that dust or the like contained in the outside air taken from below the outside air intake opening flows against a gravity direction, and comparatively large dust or the like is less likely to be suctioned.

(Configuration 6) The internal combustion engine according to configuration 3, wherein the cyclone ventilation part is formed by joining a body member and a cover member of the air cleaner device.

According to this configuration, the housing that houses the air cleaner element and the cyclone ventilation part can be formed simply by joining the body member and the cover member, which can reduce manufacturing man-hours and can reduce manufacturing cost.

(Configuration 7) The internal combustion engine according to configuration 2, wherein a ventilation flow path from the outside air intake opening to the cyclone ventilation part is provided in an upper part of the cyclone ventilation part and substantially orthogonally to an axis of cyclonic flow.

According to this configuration, a cyclone vortex can be easily generated inside the cyclone ventilation part with a simple configuration.

(Configuration 8) The internal combustion engine according to any one of configurations 1 to 7, which is a vertical type for use in a lawn mower or a construction machine and includes the crankshaft extending in a substantially vertical direction.

According to this configuration, when the internal combustion engine is used in the lawn mower, construction machine or the like, the engine is effectively used in an environment where dust or the like is likely to be generated due to the work.

REFERENCE SIGNS LIST

1 internal combustion engine
10 cooling air intake cover
11 cooling air intake part
12 cooling air intake port
20 air cleaner device
21 body member
22 cover member
23 air cleaner element
24 body side housing
25 ventilation duct
26 air feeding opening
28 cyclone cup
29 cover side housing
31 cyclone ventilation part
32 outside air intake member
33 outside air intake opening
34 air suction flow path
35 partition wall

The invention claimed is:

1. An internal combustion engine comprising:

a crankshaft, a cooling air intake device that houses a cooling fan coupled to the crankshaft and that includes a cooling air intake port which opens to an outside of the internal combustion engine, and an air cleaner device that feeds outside air to an air suction port to a cylinder, wherein the air cleaner device includes an outside air intake opening that opens to the outside and toward the cooling air intake port, the air cleaner device includes a cyclone ventilation part that supplies the outside air in a cyclonic state from the outside air intake opening, the air cleaner device includes: an air cleaner element through which the outside air passes; a body member that covers the air cleaner element from a lower side in a gravity direction; and a cover member that covers the air cleaner element from an upper side in the gravity direction, the cyclone ventilation part is formed by joining the body member and the cover member of the air cleaner device.

2. The internal combustion engine according to claim 1, wherein a part of the outside air intake opening of the air cleaner device faces a cooling air intake cover of the cooling air intake device with a predetermined gap.

3. The internal combustion engine according to claim 2, wherein a ventilation flow path from the outside air intake opening to the cyclone ventilation part is provided in an upper part of the cyclone ventilation part and substantially orthogonally to an axis of cyclonic flow.

4. The internal combustion engine according to claim 1, wherein a filter housing that houses an air cleaner element is disposed between a connector to the air suction port of the air cleaner device and the cyclone ventilation part.

5. The internal combustion engine according to claim 1, wherein at least a part of the outside air intake opening of the air cleaner device is disposed lower than the cooling air intake port.

6. The internal combustion engine according to claim 1, wherein the internal combustion engine is a vertical type for use in a lawn mower or a construction machine and includes the crankshaft extending in a substantially vertical direction.

7. The internal combustion engine according to claim 1, wherein a cyclone cup which constitutes a part of the cyclone forming section and into which dust contained in the outside air is to drop down is integrally provided to the body member, a partition wall forming the cyclonic state of the outside air taken from the outside air intake member is integrally provided to the cover member.

* * * * *